No. 792,600. Patented June 20, 1905.

UNITED STATES PATENT OFFICE.

KARL KREKELER, OF ELBERFELD, AND AUGUST BLANK, OF LEVERKUSEN, NEAR COLOGNE, GERMANY, ASSIGNORS TO FARBENFABRIKEN OF ELBERFELD CO., OF NEW YORK, N. Y., A CORPORATION OF NEW YORK.

REDDISH AZO DYE.

SPECIFICATION forming part of Letters Patent No. 792,600, dated June 20, 1905.

Application filed February 18, 1905. Serial No. 246,306.

*To all whom it may concern:*

Be it known that we, KARL KREKELER, doctor of philosophy, chemist, residing at Elberfeld, and AUGUST BLANK, doctor of philosophy, chemist, residing at Leverkusen, near Cologne, Germany, (both assignors to the FARBENFABRIKEN OF ELBERFELD CO., of New York,) have invented a new and useful Improvement in New Azo Dyes; and we hereby declare the following to be a clear and exact description of our invention.

This invention relates to the production of new azo dyestuffs which can be obtained by combining diazo compounds with the 1.2-naphtimidazol-5-oxy-7-sulfonic acid or derivatives thereof substituted in the heterocyclic nucleus having the following general formula:

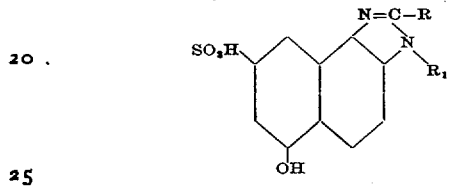

R and R₁ meaning hydrogen or an aryl or alkyl. The said naphtimidazols can be obtained by the action of aldehydes, acid anhydrids, or acid chlorids on the 1.2-diamido-5-naphthol-7-sulfonic acid. On employing acid anhydrids or acid chlorids the acidyl derivatives at first produced must be heated with acids in order to form the heterocyclic nucleus.

The new dyestuffs are in the shape of their alkaline salts from red to dark powders soluble in water with from a red to reddish-blue color, soluble in concentrated sulfuric acid with from a bluish-red to blue color, and dyeing unmordanted cotton from red to reddish-blue shades.

In carrying out the new process practically we can proceed as follows, the parts being by weight: Fifty-eight parts of the hydrochlorid of 1.2-diamido-5-naphthol-7-sulfonic acid (obtainable by reduction of the azo dye prepared in acid solution from diazo-para-nitrobenzene and 2-amido-5-naphthol-7-sulfonic acid) are dissolved in two thousand parts of water with the addition of twenty parts of sodium carbonate, and forty parts of pulverized meta-nitrobenzoyl chlorid are added thereto while stirring. The reaction mass must reach neutral during the whole operation. After the reaction is terminated it is rendered acid by the addition of sulfuric acid and then heated to boiling for some time. The meta-nitrophenyl-1.2-naphtimidazol-5-oxy-7-sulfonic acid having the formula:

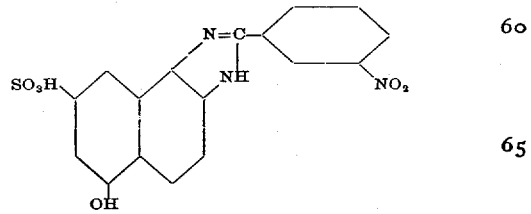

precipitates after a short while. It is filtered off and dried. The preparation of azo dyes with the aid of this compound is carried out in the usual way. The resulting coloring-matters dye wool and cotton from red to bluish-red shades.

The nitrophenyl-oxy-naphtimidazol-sulfonic acid, the preparation of which is above described, can be converted into the corresponding amido compound by suitable reduction. For this purpose the nitro compound is, *e. g.*, introduced into a boiling mixture of two hundred parts of iron filings and two hundred and fifty parts of water mixed with a small quantity of sulfuric acid. The mixture is heated to boiling for about two hours on adding from time to time the quantity of water which evaporates. The liquid is then rendered alkaline by the addition of sodium carbonate. It is filtered off, and the filtered liquid is acidulated, by which means the meta-amidophenyl-1.2-naphtimidazol-5-oxy-7-sulfonic acid is precipitated. It is filtered off, washed, and dried. The preparation of the azo dyestuffs with the aid of this product is carried out in the usual way—*e. g.*, in the following manner: Forty parts of the meta-amidophenyl-1.2-naphtimidazol-5-oxy-7-sulfonic acid dissolved in a solution of forty parts of sodium carbonate in one thousand parts of hot water are cooled, and to the cold liquid the diazo solution prepared in the usual manner from 10.7 parts of ortho-toluidin is added. The resulting dyestuff is then isolated, dried, and pulverized. It is in the shape of its sodium salt a red powder soluble in water with a red and in concentrated sulfuric acid with a bluish-red color. By reduction with stannous chlorid and hydrochloric acid ortho-toluidin and meta-amidophenyl-1.2-naphtimidazol-5-oxy-6-amido-7-sulfonic acid, the diazo derivative of which gives a red dye with 2-naphthol-3.6-disulfonic acid in alkaline solution, is obtained.

The new dyestuff dyes unmordanted cotton red shades. It can be diazotized on the fiber and further combined with amins and phenols. On using, e. g., beta-naphthol bright-red shades fast to washing and to light are obtained.

The process proceeds in an analogous manner for the preparation of other 1.2-naphtimidazol-5-oxy-7-sulfonic acids on replacing the meta-nitrobenzoylchlorid—e. g., by acetic anhydrid, benzoylchlorid, or the like. From the methyl or phenyl 1.2-naphtimidazol-5-oxy-7-sulfonic acid thus produced dyestuffs are obtained which dye cotton from red to bluish-red shades.

Instead of diazotized ortho-toluidin diazo compounds of other amins can be employed—such as anilin, xylidin, amidophenols, kresols, amidophenol or kresol ether, naphthylamin, acidyl-diamins, amidoazobenzene or the sulfonic acids thereof, amido carbonic acids, nitro and chloroanilins, or the like.

Having now described our invention and in what manner the same is to be performed, what we claim as new, and desire to secure by Letters Patent, is—

1. The herein-described new azo dyestuffs obtainable by combining diazo compounds with naphtimidazols having the above-given general formula, which dyestuffs are in the shape of their alkaline salts from red to dark powders soluble in water with from a red to reddish-blue color; soluble in concentrated sulfuric acid with from a bluish-red to blue color; and dyeing unmordanted cotton from red to reddish-blue shades, substantially as hereinbefore described.

2. The herein-described new azo dyestuff, which can be obtained by combining the diazo derivative of ortho-toluidin with the meta-amidophenyl-1.2-naphtimidazol-5-oxy-7-sulfonic acid, which dyestuff is in the shape of its sodium salt a red powder soluble in water with a red and in concentrated sulfuric acid with a bluish-red color; yielding upon reduction with stannous chlorid and hydrochloric acid ortho-toluidin and meta-amidophenyl-1.2-naphtimidazol-5-oxy-6-amido-7-sulfonic acid which gives a red dye by combination of its diazo compound with 2-naphthol-3.6-disulfonic acid; and dyeing unmordanted cotton red shades which shades can be further diazotized and developed on the fiber by means of beta-naphthol, pure-red shades being thus obtained which are fast to washing and light, substantially as hereinbefore described.

In testimony whereof we have signed our names in the presence of two subscribing witnesses.

KARL KREKELER.
AUGUST BLANK.

Witnesses:
OTTO KÖNIG,
PAUL HEDEIGE.

---

It is hereby certified that in Letters Patent No. 792,600, granted June 20, 1905, upon the application of Karl Krekeler, of Elberfeld, and August Blank, of Leverkusen, near Cologne, Germany, for an improvement in "Reddish Azo Dyes," an error appears in the printed specification requiring correction, as follows: In line 52, page 1, the word "reach" should read *react*; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.* lowing manner: Forty parts of the meta-amidophenyl-1.2-naphtimidazol-5-oxy-7-sulfonic acid dissolved in a solution of forty parts of sodium carbonate in one thousand parts of hot water are cooled, and to the cold liquid the diazo solution prepared in the usual manner from 10.7 parts of ortho-toluidin is added. The resulting dyestuff is then isolated, dried, and pulverized. It is in the shape of its sodium salt a red powder soluble in water with a red and in concentrated sulfuric acid with a bluish-red color. By reduction with stannous chlorid and hydrochloric acid ortho-toluidin and meta-amidophenyl-1.2-naphtimidazol-5-oxy-6-amido-7-sulfonic acid, the diazo derivative of which gives a red dye with 2-naphthol-3.6-disulfonic acid in alkaline solution, is obtained.

The new dyestuff dyes unmordanted cotton red shades. It can be diazotized on the fiber and further combined with amins and phenols. On using, e. g., beta-naphthol bright-red shades fast to washing and to light are obtained.

The process proceeds in an analogous manner for the preparation of other 1.2-naphtimidazol-5-oxy-7-sulfonic acids on replacing the meta-nitrobenzoylchlorid—e. g., by acetic anhydrid, benzoylchlorid, or the like. From the methyl or phenyl 1.2-naphtimidazol-5-oxy-7-sulfonic acid thus produced dyestuffs are obtained which dye cotton from red to bluish-red shades.

Instead of diazotized ortho-toluidin diazo compounds of other amins can be employed—such as anilin, xylidin, amidophenols, kresols, amidophenol or kresol ether, naphthylamin, acidyl-diamins, amidoazobenzene or the sulfonic acids thereof, amido carbonic acids, nitro and chloroanilins, or the like.

Having now described our invention and in what manner the same is to be performed, what we claim as new, and desire to secure by Letters Patent, is—

1. The herein-described new azo dyestuffs obtainable by combining diazo compounds with naphtimidazols having the above-given general formula, which dyestuffs are in the shape of their alkaline salts from red to dark powders soluble in water with from a red to reddish-blue color; soluble in concentrated sulfuric acid with from a bluish-red to blue color; and dyeing unmordanted cotton from red to reddish-blue shades, substantially as hereinbefore described.

2. The herein-described new azo dyestuff, which can be obtained by combining the diazo derivative of ortho-toluidin with the meta-amidophenyl-1.2-naphtimidazol-5-oxy-7-sulfonic acid, which dyestuff is in the shape of its sodium salt a red powder soluble in water with a red and in concentrated sulfuric acid with a bluish-red color; yielding upon reduction with stannous chlorid and hydrochloric acid ortho-toluidin and meta-amidophenyl-1.2-naphtimidazol-5-oxy-6-amido-7-sulfonic acid which gives a red dye by combination of its diazo compound with 2-naphthol-3.6-disulfonic acid; and dyeing unmordanted cotton red shades which shades can be further diazotized and developed on the fiber by means of beta-naphthol, pure-red shades being thus obtained which are fast to washing and light, substantially as hereinbefore described.

In testimony whereof we have signed our names in the presence of two subscribing witnesses.

KARL KREKELER.
AUGUST BLANK.

Witnesses:
  OTTO KÖNIG,
  PAUL HEDEIGE.

---

It is hereby certified that in Letters Patent No. 792,600, granted June 20, 1905, upon the application of Karl Krekeler, of Elberfeld, and August Blank, of Leverkusen, near Cologne, Germany, for an improvement in "Reddish Azo Dyes," an error appears in the printed specification requiring correction, as follows: In line 52, page 1, the word "reach" should read *react*; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.*

It is hereby certified that in Letters Patent No. 792,600, granted June 20, 1905, upon the application of Karl Krekeler, of Elberfeld, and August Blank, of Leverkusen, near Cologne, Germany, for an improvement in "Reddish Azo Dyes," an error appears in the printed specification requiring correction, as follows: In line 52, page 1, the word "reach" should read *react*; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.*